US006772724B2

(12) United States Patent
Glugla et al.

(10) Patent No.: US 6,772,724 B2
(45) Date of Patent: Aug. 10, 2004

(54) VARIABLE DISPLACEMENT ENGINE STARTING CONTROL

(75) Inventors: Christopher Paul Glugla, Macomb, MI (US); John Ottavio Michelini, Sterling Heights, MI (US); Michael Flory, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 10/063,012

(22) Filed: Mar. 12, 2002

(65) Prior Publication Data

US 2003/0172892 A1 Sep. 18, 2003

(51) Int. Cl.[7] .............................................. F02N 17/00
(52) U.S. Cl. .............................. 123/179.5; 123/182.1; 123/481
(58) Field of Search ............................ 123/179.5, 48.1, 123/198 F, 182.1

(56) References Cited

U.S. PATENT DOCUMENTS

| | | | |
|---|---|---|---|
| 4,144,863 A | | 3/1979 | Abdoo |
| 4,173,209 A | * | 11/1979 | Jordan ..................... 123/198 F |
| 4,175,534 A | * | 11/1979 | Jordan ..................... 123/198 F |
| 4,335,687 A | | 6/1982 | Sugasawa et al. |
| 4,376,426 A | | 3/1983 | Iizuka et al. |
| 4,565,167 A | * | 1/1986 | Bryant ..................... 123/70 R |
| 5,117,790 A | | 6/1992 | Clarke et al. |
| 5,408,966 A | * | 4/1995 | Lipinski et al. ........... 123/198 F |
| 5,496,228 A | * | 3/1996 | Takata et al. ................ 477/107 |
| 5,803,040 A | * | 9/1998 | Biesinger et al. ......... 123/198 F |
| 6,209,526 B1 | * | 4/2001 | Sun et al. .................... 123/481 |
| 6,431,154 B1 | * | 8/2002 | Inoue ......................... 123/481 |
| 6,553,959 B2 | * | 4/2003 | Xu et al. ..................... 123/295 |
| 6,616,570 B2 | * | 9/2003 | Wakashiro et al. ............. 477/5 |

FOREIGN PATENT DOCUMENTS

| | | |
|---|---|---|
| EP | 0 037 269 | 7/1981 |
| GB | 2367859 | 4/2002 |
| JP | 57-195835 | 12/1982 |

* cited by examiner

*Primary Examiner*—John Kwon
(74) *Attorney, Agent, or Firm*—Brooks Kushman P.C.; Carlos Hanze

(57) ABSTRACT

A system and method for controlling a variable displacement engine during cranking and starting period include a hybrid operating mode to allow intake/exhaust valve operation while preventing fuel delivery or spark, or both, to at least one subsequently deactivated cylinder or bank of cylinders during the cranking and starting period. The system and method provide advantages to starting the engine relative to either a variable displacement mode or a full activation mode.

8 Claims, 2 Drawing Sheets

VARIABLE DISPLACEMENT ENGINE STARTING CONTROL

BACKGROUND OF INVENTION

1. Field of the Invention

The present invention relates to a system and method for controlling a variable displacement engine during starting.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Depending upon the particular configuration of the variable displacement engine, one or more cylinders may be selectively deactivated to improve fuel economy under light load conditions, for example. When one or more cylinders are deactivated, fuel and spark are not provided to those cylinders and the associated intake/exhaust valves are not operated and therefore remain closed. In some engine configurations, a group of cylinders, which may be an entire bank of cylinders, is selectively deactivated under appropriate operating conditions.

Fuel economy and emission benefits may be associated with starting and operating a variable displacement engine with one or more cylinders deactivated. However, cranking and starting the engine with at least some of the cylinders deactivated using conventional control strategies may result in slower crank speeds and associated harshness that is undesirable for many drivers. The inventors herein have recognized that crank/startup harshness may be due to the "air spring" effect of the deactivated cylinders and the stopping position of the crankshaft.

SUMMARY OF INVENTION

The present invention provides a system and method for controlling a variable displacement engine during cranking and starting. In carrying out various objects, advantages and features of the invention, a system and method for controlling a variable displacement internal combustion engine during cranking and starting include a hybrid operating mode to allow intake/exhaust valve operation while preventing fuel delivery or spark, or both, for at least one of the subsequently deactivated cylinders or bank of cylinders during cranking and starting.

The present invention has a number of advantages relative to conventional starting control of variable displacement engines in either the partial or full activation modes. For example, the present invention provides less compression for the starter motor to overcome during cranking resulting in faster crank speeds and shorter start times. In addition, for some applications, not energizing the variable displacement mode solenoids to deactivate the intake/exhaust valves lessens the electrical load on the battery during cranking. The present invention reduces or eliminates crank stalls and generally results in less crank/startup harshness.

The above advantage and other advantages, objects, and features of the present invention will be readily apparent from the following detailed description of the preferred embodiments when taken in connection with the accompanying drawings.

DETAILED DESCRIPTION

Figure 1:
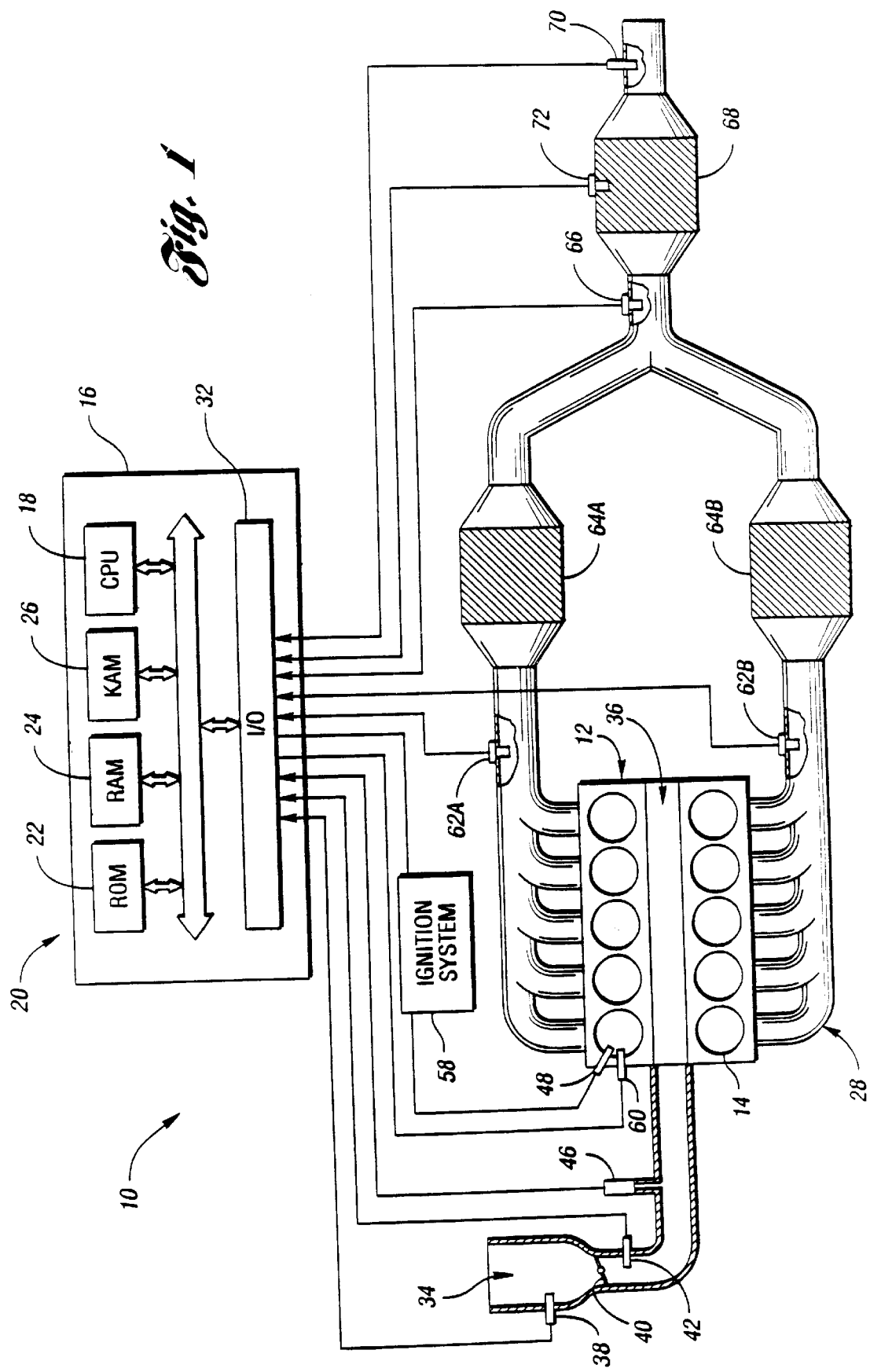
FIG. 1 is a block diagram illustrating operation of a system or method for controlling a variable displacement engine during starting according to one embodiment of the present invention.

A block diagram illustrating an engine control system for a representative internal combustion engine operable in a variable displacement mode according to the present invention is shown in FIG. 1. System 10 preferably includes an internal combustion engine 12 having a plurality of cylinders, represented by cylinder 14. In one preferred embodiment, engine 12 includes ten cylinders arranged in a "V" configuration having two cylinder banks with five cylinders each. The engine is preferably operable in a variable displacement (1–5) mode with one bank deactivated and a full activation mode (V-b) with all cylinders activated. In addition, engine 12 is operable in a hybrid mode during cranking/starting according to the present invention in which the intake/exhaust valves are allowed to operate on the subsequently deactivated bank of cylinders without fueling those cylinders as described below. As used herein, a cylinder bank refers to a related group of cylinders having one or more common characteristics, such as being located proximate one another or having a common emission control device (ECD) or exhaust manifolds for example. This would include configurations having a group of cylinders on the same side of the engine treated as a bank even though these cylinders may not share a common exhaust manifold; i.e., the exhaust manifold could be configured with separate exhaust runners or branches if desired or beneficial. Likewise, cylinder banks can also be defined for in-line cylinder configurations which are within the scope of the present invention.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor for the entire engine. However, the block diagrams of the figures generally illustrate only a single type of sensor for ease of illustration and description.

System 10 preferably includes a controller 16 having a microprocessor 18 or central processor unit (CPU) in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery (not shown). Computer-readable storage media 20 may be implemented using any of a number of known memory devices such as PROMs, EPROMs, EEPROMs, flash memory, or any other electric, magnetic, optical, or combination memory device capable of temporarily or persistently storing data, some of which represent executable instructions, used by microprocessor 18 in controlling the engine. Microprocessor 18 communicates with the various sensors and actuators via an input/output (I/O) interface 32. Of course, the present invention could utilize more than one physical controller, such as controller 16, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAE) to controller 16 indicative of the mass airflow. If no mass airflow sensor is present, a mass airflow value may be inferred from various engine operating parameters. A throttle valve 40 may be used to modulate the airflow through intake 34 during certain operating modes. Alternatively, the present invention may be used in throttleless applications, which may use electronically controlled valves and variable valve timing to modulate intake airflow. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed-loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 with associated solenoids (not shown) along with ignition timing (spark) and fuel to selectively activate/deactivate one or more cylinders 12 and to provide a hybrid cranking/starting mode for subsequent variable displacement operation according to the present invention.

A fuel injector 48 injects an appropriate quantity of fuel in injection events for the current operating mode based on a signal (FPW) generated by controller 16 processed by an appropriate driver. During cranking/starting of engine 12 according to one embodiment of the present invention, controller 16 allows the intake/exhaust valves of a subsequently deactivated bank of cylinders to operate without fueling that bank via fuel injector 48 or providing spark. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA), which is processed by ignition system 58 to control spark plug 60 and to initiate combustion within an associated cylinder 14.

Controller 16 (and a camshaft arrangement) controls one or more exhaust valves to exhaust the combusted air/fuel mixture of activated or running cylinders through an associated exhaust manifold, indicated generally by reference numeral 28. Depending upon the particular engine configuration, one or more exhaust manifolds may be used. In one preferred embodiment, engine 12 includes an exhaust manifold 28 associated with each bank of cylinders as illustrated in FIG. 1. During a hybrid cranking/starting mode according to one embodiment of the present invention, controller 16 (and a camshaft arrangement such as disclosed in U.S. Pat. No. 6,250,283, for example, the disclosure of which is incorporated herein by reference) controls operation of intake/exhaust valves for subsequently deactivated cylinders and allows the valves to operate as if the cylinders were activated but without providing fuel or spark. According to conventional control strategies for a variable displacement engine starting in the variable displacement mode, the one or more cylinders would be deactivated and the valves would remain closed. As such, the motion of the piston within the deactivated cylinders and associated vacuum/compression creates an "air spring" effect that resists rotation of the crankshaft and must be overcome by the starter motor. The hybrid starting mode of the present invention allows the intake/exhaust valves of the VDE cylinders to be operated to reduce or eliminate the "air spring" effect of the conventional control strategies. For these cylinders, then, the exhaust is simply the intake air because no fuel or spark is provided.

Depending upon the particular system configuration for controlling operation of the intake/exhaust valves, the present invention may also modify valve timing to open the exhaust valves of VDE mode cylinders during the compression stroke to further reduce the necessary cranking power. For example, variable valve timing applications using electromagnetic valve actuators have sufficient control authority to independently vary the valve timing of VDE mode cylinders during starting to provide this additional advantage. Those of ordinary skill in the art will recognize various other alternative implementations consistent with this feature of the present invention.

An exhaust gas oxygen sensor 62 is preferably associated with each bank of cylinders and provides a signal (EGO) indicative of the oxygen content of the exhaust gases to controller 16. As known by those of ordinary skill in the art, the EGO signal may be used as feedback in a closed-loop controller to control the air/fuel ratio provided to one or more associated cylinders and may be provided by various types of sensors including heated exhaust gas oxygen sensors (HEGO) or universal exhaust gas oxygen sensors (UEGO), for example.

The exhaust gas oxygen sensor signals may be used to independently adjust the air/fuel ratio, or control the operating mode of one or more cylinders or banks of cylinders. The exhaust gas passes through the exhaust manifold 28 to associated upstream emission control devices (ECDs) 64A and 64B, which may be catalytic converters, for example. After passing through the associated upstream ECDs, the exhaust gas may be combined and flow past an underbody exhaust gas oxygen sensor 66 and through a downstream or underbody emission control device 68 before flowing past a catalyst monitoring sensor 70 (typically another exhaust gas oxygen sensor) and being exhausted to atmosphere. While FIG. 1 illustrates a "Y" pipe configuration in which the exhaust of each bank is combined after passing through the associated upstream ECDs, the present invention is equally applicable to "straight pipe" configurations.

A temperature sensor 72 may be provided to monitor the temperature of a catalyst within emission control device 68, depending upon the particular application. Alternatively, the temperature may be estimated using an appropriate temperature model based on various other sensed or estimated engine/vehicle parameters, which may include, for example, mass airflow, manifold absolute pressure or load, engine speed, air temperature, engine coolant temperature, and engine oil temperature. Likewise, temperature of exhaust gas oxygen sensors 62A, 62B and/or 66 can be measured or estimated using an appropriate model. A representative temperature model is described in U.S. Pat. No. 5,956,941, for example.

Figure 2:
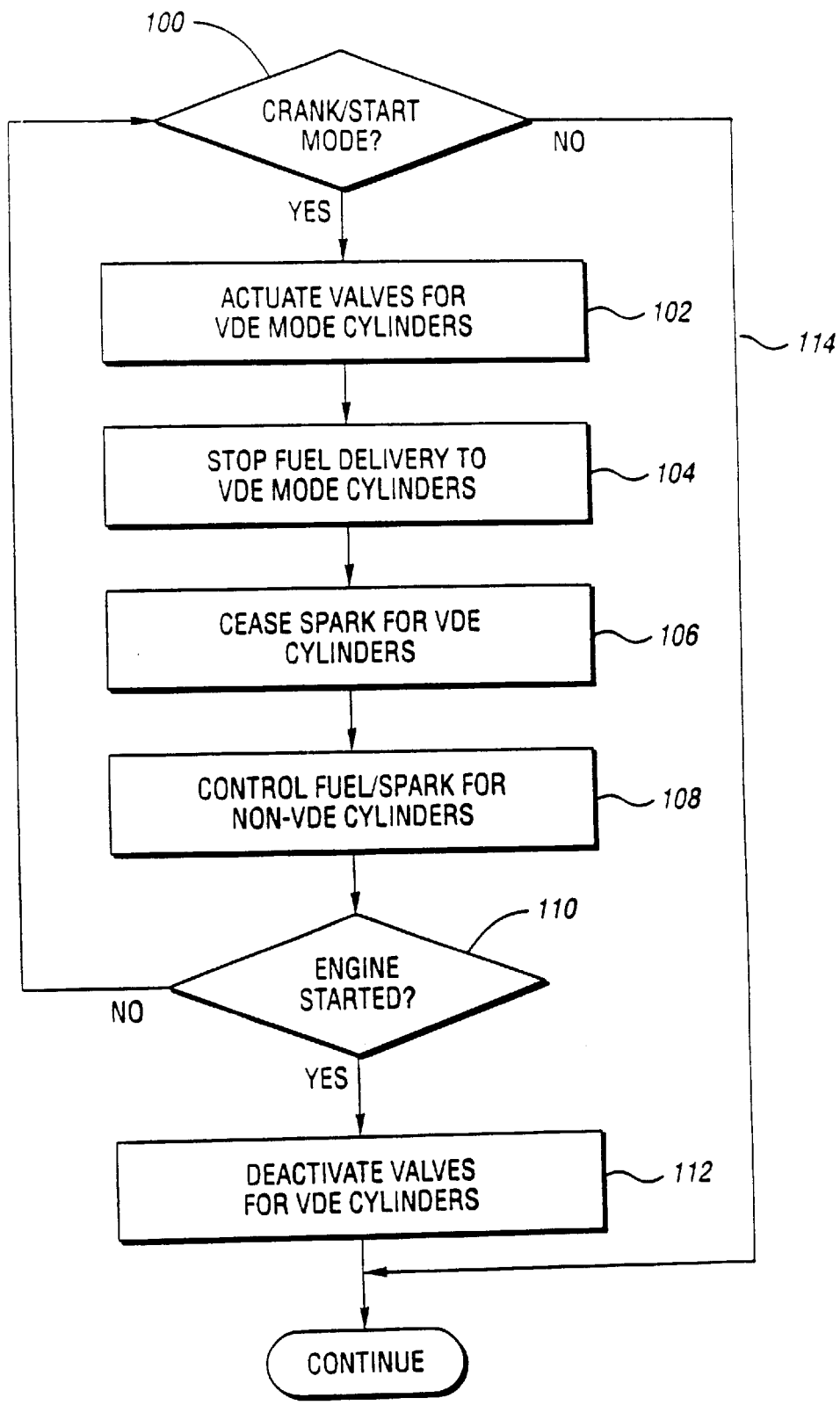
FIG. 2 is a flow chart illustrating a software routine for controlling a variable displacement engine during starting according to one embodiment of the present invention.

The diagram of FIG. 2 generally represents operation of one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, control logic for the illustrated embodiment is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

A flow diagram illustrating operation of a system or method for controlling a variable displacement engine during cranking and starting, according to one embodiment of the present inventions is shown in FIG. 2. Block 100 of FIG. 2 represents a determination of whether operating conditions are consistent with the hybrid cranking/starting mode according to one embodiment of the present invention. Representative operating parameters or conditions may include acceptable engine coolant temperature, oil temperature, ambient temperature, barometric pressure, engine speed, accelerator pedal position, etc. If the current ambient/temperature conditions are not appropriate for cranking/starting in the hybrid mode as determined by block 100, the routine is exited as represented at 114. The engine controller may then proceed to various other logic to determine if full activation, partial activation, or other cranking/starting modes are appropriate.

If block 100 determines the current ambient/engine operating conditions are appropriate for hybrid cranking/starting, block 102 allows the intake and/or exhaust valves associated with the selectively actuatable (VDE) cylinders to operate as if those cylinders were actuated. In addition, a hybrid valve timing may be provided, for appropriately configured engines, to open the exhaust valves during the compression stroke to further reduce necessary cranking force and further increase cranking speed. In one embodiment, solenoids associated with deactivating the intake/exhaust valves remain de-energized such that the valves operate as if the VDE mode cylinders were activated. In this embodiment, electrical load on the battery is reduced by not activating the solenoids. As such, additional power is available for the starter motor which provides additional cranking force and resulting faster cranking speeds.

Fuel delivery to the VDE mode cylinders is prevented or stopped as represented by block 104. Likewise, no spark is provided to the VDE mode cylinders during the hybrid cranking/starting mode as represented by block 106. However, fuel and spark are provided to the remaining (non-VDE mode) cylinders as represented by block 108 to start the engine. If the engine has not started as represented by block 110, control returns to block 100 and the process is repeated. Engine start is typically determined based on engine speed (RPM) exceeding a calibratable threshold. Once the engine has started as determined by block 110, and other operating conditions indicate variable displacement mode is appropriate, the valves associated with the VDE mode cylinders are deactivated as represented by block 112.

As such, the present invention provides a hybrid operating mode for cranking and starting of a variable displacement internal combustion engine, which generally results in less compression for the starter motor, less electrical load on the battery, reduced or eliminated crank stalls, and overall less harshness during starting.

While the best mode for carrying out the invention has been described in detail, those familiar with the art to which this invention relates will recognize various alternative designs and embodiments for practicing the invention as defined by the following claims.

What is claimed is:

1. A method for controlling an internal combustion engine having a plurality of cylinders with associated intake and exhaust valves, at least some of which are selectively operable in a variable displacement mode in which the intake and exhaust valves are selectively deactivated, the method comprising:

actuating the associated intake and exhaust valves while deactivating fueling and spark for the variable displacement mode cylinders during starting of the internal combustion engine.

2. The method of claim 1 further comprising:

deactivating the intake and exhaust valves of the variable displacement mode cylinders after starting the internal combustion engine.

3. The method of claim 1 further comprising:

modifying selectively timing of the intake and exhaust valves of the variable displacement mode cylinders during starting to reduce compression of inducted air during a compression stroke of the internal combustion engine.

4. The method of claim 1 wherein actuating the associated intake and exhaust valves includes de-energizing associated solenoids.

5. A method for controlling an internal combustion engine having a plurality of cylinders with associated intake and exhaust valves, at least some of which are selectively operable in a variable displacement mode in which the intake and exhaust valves are selectively deactivated, the method comprising:

monitoring operating parameters to determine whether to start the engine in a hybrid operating mode;

actuating valves for the variable displacement mode cylinders while preventing fuel and spark during a cranking and starting period to reduce cranking effort and to increase cranking speed during the cranking and starting period in the hybrid operating mode; and deactivating the valves for the variable displacement mode cylinders, after determining the engine has started, to operate the engine in the variable displacement mode.

6. The method of claim 5 wherein the valves for the variable displacement mode cylinders are deactivated when engine speed exceeds a threshold.

7. The method of claim 5 wherein monitoring operating parameters includes monitoring temperature.

8. The method of claim 7 wherein the temperature is an engine fluid temperature.

* * * * *